July 28, 1925.
G. S. WALPOLE
1,547,275
CARD CUTTING APPARATUS
Filed Nov. 21, 1924
3 Sheets-Sheet 1
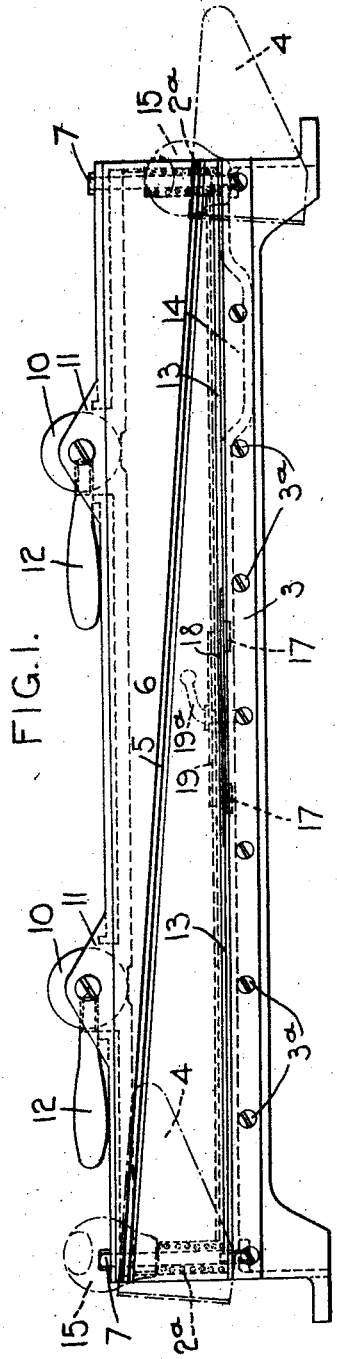
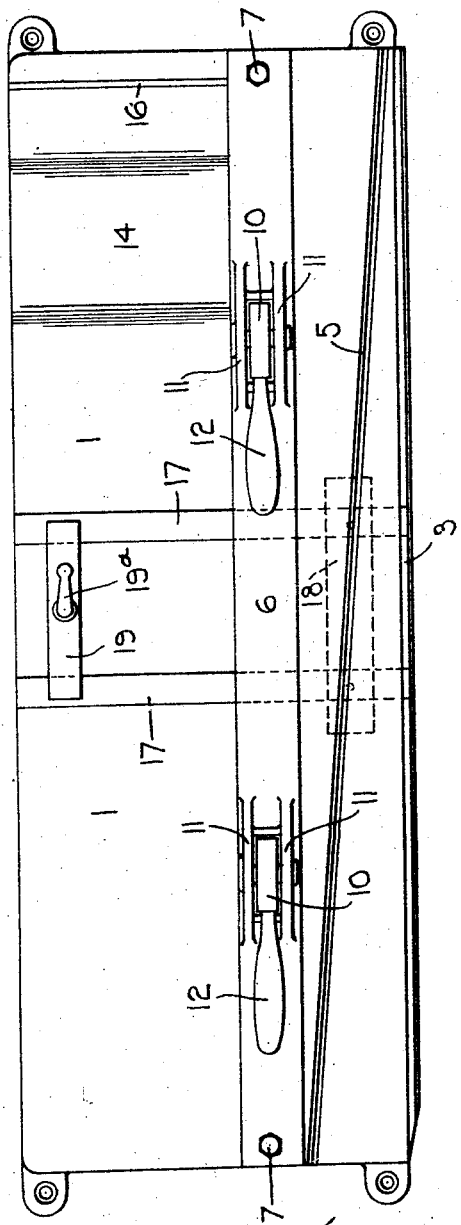
Inventor
George S. Walpole
by Herbert W. Jenner,
Attorney.

July 28, 1925.
G. S. WALPOLE
CARD CUTTING APPARATUS
Filed Nov. 21, 1924     3 Sheets-Sheet 2
1,547,275
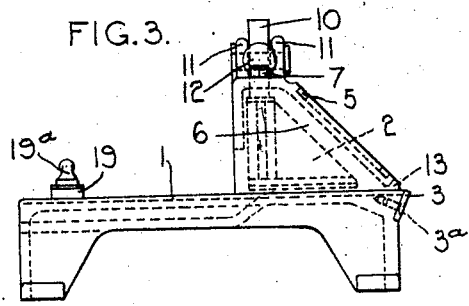
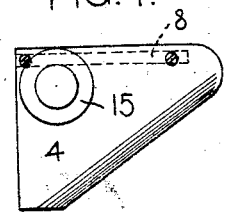
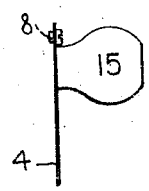
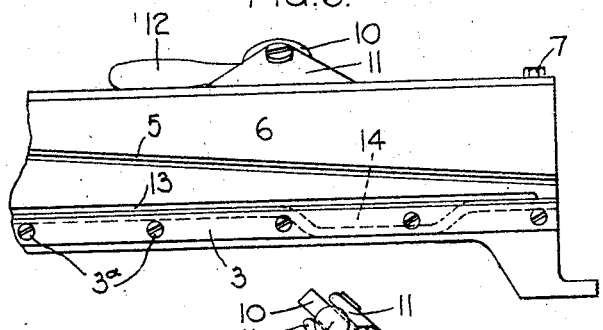
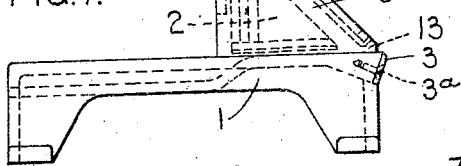
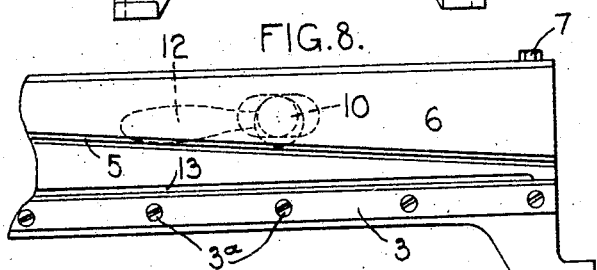
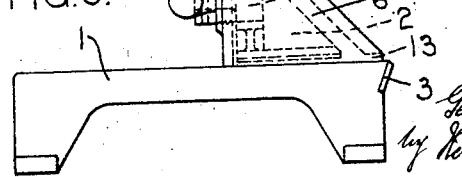

July 28, 1925.

G. S. WALPOLE 1,547,275

CARD CUTTING APPARATUS

Filed Nov. 21, 1924

Inventor
George S. Walpole
by Herbert W. Brenner
Attorney

Patented July 28, 1925.

1,547,275

UNITED STATES PATENT OFFICE.

GEORGE STANLEY WALPOLE, OF LONDON, ENGLAND, ASSIGNOR OF ONE-HALF TO G. D. PETERS & COMPANY, LIMITED, OF SLOUGH, ENGLAND, A BRITISH COMPANY.

CARD-CUTTING APPARATUS.

Application filed November 21, 1924. Serial No. 751,286.

*To all whom it may concern:*

Be it known that I, GEORGE STANLEY WALPOLE, a subject of the King of Great Britain, residing at London, England, have invented certain new and useful Improvements in Card-Cutting Apparatus; and I do hereby declare the following to be a full, clear, and exact description of the invention, such as will enable others skilled in the art to which it appertains to make and use the same.

This invention relates to apparatus for cutting bevelled edges on picture mounts, cards and the like, of the type in which means are provided whereby the cutting knife or tool is, during the action of cutting the card, held in or guided at the angle which corresponds to or determines the angle of the bevelled edge cut on the card, and the cutting knife is also guided or compelled to move downwardly by an oblique or downwardly sloping guide with which the knife co-operates so that a shearing cut is effected, the card, during the cutting action, being held or clamped on the base plate or table portion of the apparatus by a clamping bar or block, a fixed blade or cutting edge fixed to the said base plate or table being provided with which the movable cutting knife or tool co-operates for effecting the cut.

The present invention has for its object to provide improved apparatus of the type above indicated, apparatus embodying the invention being such as to ensure that clean cuts free from imperfections or roughness shall be made, and the necessity of frequent or comparatively frequent adjustments or repairs for maintaining the machine in good working condition is avoided. Apparatus according to this invention is both simple and robust in construction and such that a large number of clean cuts can be expeditiously made without the apparatus requiring any attention or repair to ensure this desirable result being attained.

In apparatus according to this invention the fixed cutting edge or blade, instead of as heretofore being arranged horizontally on or in a recess in, and flush or approximately flush with, the surface of the table or base plate on which the card rests, the fixed blade is arranged at a suitable angle to the said surface. For instance, the said fixed blade may be secured to the front side of the aforesaid base plate or table over which the card to be cut projects; a suitable recess may be formed in the said front vertical face or side of the table to receive the said blade, the said recess being so formed that the blade, with its lower edge lying on the bottom of the recess, projects upwardly so that its sides lie at the required or predetermined angle to the aforesaid front or side face of the table, the upper edge of the blade being preferably bevelled or sloped downwardly from the inner to the outer side of the body of the blade.

The upper edge of the body of the aforesaid fixed blade lies at an angle to the vertical corresponding to the angle of the bevelled edge to be cut on the card.

Further, instead of employing a separately attached oblique member for guiding or compelling the cutting knife to move downwardly during the cutting action so as to effect a shearing cut, the means for maintaining and guiding the movable cutting knife or blade at the required or predetermined angle (corresponding to or determining the angle of the bevel cut to be made) itself also constitutes the said guide or means for guiding or compelling the said cutting knife to move downwardly during the cutting action so as to effect a shearing cut. This guiding means is such that a guide or guide member formed on or fixed to the movable knife can be engaged or can co-operate with it in such a manner that the knife is positively guided, both as to the angle or position in which it lies for effecting the cut and as to its downward movement, the said guiding means comprising a downwardly sloping surface or surfaces on which the guide member on the knife bears and is supported during the entire movement of the knife for cutting the card.

Figs. 1, 2 and 3 of the accompanying illustrative drawings show in front elevation, plan and end elevation respectively, one construction of bevel card cutting apparatus embodying the invention.

Figs. 4 and 5 show in front elevation and end elevation respectively the movable cutting knife of the apparatus shown in Figs. 1 to 3.

Figs. 6 and 7 illustrate a modified form of cutting apparatus according to the invention, Fig. 6 being a front elevation of sufficient of the apparatus to illustrate the invention and Fig. 7 being an end elevation thereof.

Figs. 8 and 9 are similar views to Figs. 6 and 7 respectively, illustrating a further modified construction of the improved bevel card cutting apparatus.

Figure 10:
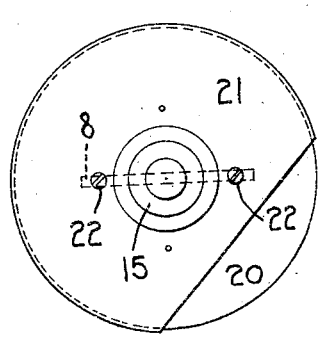
Figs. 10 and 11 illustrate in front elevation and end elevation respectively, another construction of cutting knife for use with the improved cutting apparatus.

The machine shown in Figs. 1 to 5 comprises a base plate or table 1 on which the card to be cut is held or clamped by a bar or block 2.

The front side of the table or base 1 is formed with a recess to receive the fixed cutting edge or blade 3. Screws 3ª fix the blade 3 to the table 1 and the construction and arrangement are such that the blade 3 is at a cutting angle relatively to the surface of the table or base 1. The upper edge of the blade 3 is bevelled or sloped downwardly as shown.

The means for maintaining and guiding the movable cutting knife 4 consist of a channel or groove 5 formed in a member 6 secured as by screws 7 to the base plate or table 1 at or adjacent to the front side or edge thereof over which the edge of the card to be cut projects, and the guide member on the movable knife or knife blade 4 consists of a strip, rib or bar 8 secured to the knife blade with its upper side or edge parallel with the upper or back (non-cutting) edge of the knife 4 the cutting edge of which may be disposed at a suitable angle to the said upper edge.

The bottom and sides of the channel or groove 5 which constitute the guide for the movable knife 4 are preferably arranged at such angles as to maintain the movable knife 4 at the required angle, i. e. the angle or slope of the bevel edge to be cut in the card. Further the member 6 in which the guide channel or groove 5 is formed consists of a hollow casting constituting a bar or bridge extending from side to side of the base plate or table 1 and secured thereto by the screws 7 at each end thereof. The guide channel 5 is formed in the front face of this bridge, which face is a sloping face arranged at an angle corresponding to that of the bottom of the channel 5, i. e. at an angle corresponding to the angle of the cut to be made, and this sloping face may lie in the same plane as the hereinbefore mentioned bevelled or sloping upper edge of the fixed cutting blade 3.

Within the hollow casting or bridge piece 6 is the clamping block or bar 2 which is made of suitable material, preferably wood and the bottom of which may be covered with felt in order when the block is pressed down to firmly clamp the card in position on the base plate or table and hold it firmly during the cutting operation. The clamping block is preferably mounted at its ends on suitable springs 2ª surrounding the screws 7 and which tend to raise the block out of contact with the table 1, and the said block may be pressed and held down in its clamping position by two cams or eccentrics 10 working through slots in the top of the hollow casting or bridge 6, suitable bearings 11 for the spindles of the cams 10 being formed or provided on the top of the casting 6 at either side of the slots therein. A suitable operating handle 12 is provided in connection with each cam or eccentric 10. Instead of two cams 10 as shown one centrally arranged cam only may in some cases be provided.

The hollow fixed casting or bridge 6 is so formed that there is a space or slot 13 of suitable dimensions between the base or table 1 and the bottom of the front and rear walls of the casting 6 through which slot the card to be cut can be readily slipped into position beneath the said casting and the clamping block 2 therein, the portion of the card projecting beyond the table 1 resting on the cutting edge of the fixed cutting blade 3.

The base plate or table 1 is preferably formed or provided with a depression or recess 14 in its upper surface, the said depression extending from the rear edge of the table towards the centre thereof and constituting a pocket into which the hand can be readily inserted beneath the card on the table for removing same after the cut has been made.

The removable cutting knife 4 may be and preferably is made as a separate unit and it consists of a suitably shaped blade preferably hollow ground on the inside along the cutting edge. The knife is furnished with a suitable handle 15 projecting laterally from and at right angles to the blade.

For the sake of clearness the movable cutting knife 4 is not shown in full lines in Figs. 1, 2 and 3 but in Fig. 1 it is indicated in broken lines in the position it occupies at the commencement and at the end of a cutting stroke. 16, Fig. 2, indicates a stop bar with which the base or table 1 may be provided.

The machine shown in Figs. 1, 2 and 3 is fitted with means to facilitate the bevel cutting of narrow cards. These means comprise two metal strips 17 arranged to slide in grooves formed therefor in the base or table 1, the upper surface of said strips being flush with the surface of the said base or table. Secured as by rivets to the said sliding strips 17 is a cross strip 18 against which can bear the edge of a narrow strip or card inserted through the slot 13. 19 indicates a bar that by means of a screw 19ª can be pressed down on to the sliding strips 17 in order to clamp the same in any desired position according to the width of the narrow strip of card to be cut.

The cutting machine or apparatus shown in Figs. 6 and 7 is similar to that shown in Figs. 1 to 3 except that the cams 10 instead of being vertical incline rearwardly at an angle corresponding to the angle of the inclined front face of the casting or bridge 6. This arrangement is convenient as the cams and bearings 11 for the cam spindles are more out of the way of the hand of the operator when manipulating the cutting knife.

In the alternative arrangement shown in Figs. 8 and 9 the cams 10 work in slots formed therefor in the card clamping block 2 and the cam spindles extend through the rear wall of the casting or bridge 6, the operating handles 12 being secured on the rearwardly projecting ends of such spindles.

Figure 11:
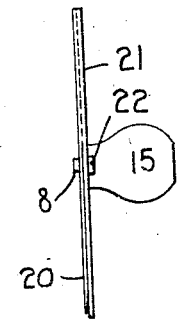

Instead of a cutting knife having but one cutting edge as shown in Figs. 4 and 5, a cutting knife 20 in the form of a disc with sharpened edge may be provided as shown in Figs. 10 and 11. Embracing such knife is a shield 21 to which the operating handle 15 is fixed. The guide strip 8 is fixed by means of screws 22 extending through holes formed therefor in the shield 21, and in the disc knife 20. An annular row of such holes are formed in the disc knife so that in order to provide a fresh cutting edge it is only necessary to withdraw the screws 22, partially rotate the disc knife, to expose a fresh portion of the cutting edge of the disc, and reinsert the screws to again fix the guide strip 8.

Figure 12:
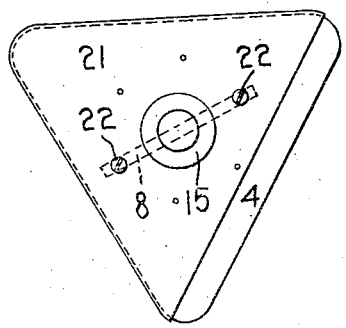
Figs. 12 and 13 are similar views to Figs. 10 and 11 respectively illustrating an alternate form of cutting knife.
Figure 13:
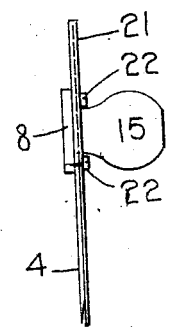

The cutting knife shown in Figs. 12 and 13 consists of a triangular knife blade 4 having three cuttings edges. Embracing such blade is a shield 21 to which the operating handle 15 is secured. The guide strip 8 is fixed by screws 22 passed through holes in the shield and knife blade. Three sets of such holes are formed, as shown, so that the cutting knife may be turned when required in order to expose any of its three cutting edges beyond the shield.

What I claim is:—

1. Card cutting apparatus, comprising a table provided with a delivery edge arranged at a right angle to the direction of the feed of material over the table, a stationary knife blade secured at the delivery edge of the table and arranged at a cutting angle relatively to its surface, a guide member secured to the table and having an inclined face arranged at an acute angle to the surface of the table, said inclined face being provided with a diagonal guide which is inclined in the plane of the said face and is also inclined longitudinally and downwardly with respect to the surface of the table, and a movable knife blade adapted to be slid along the said guide with its cutting edge overlapping the stationary blade and operating with a slicing cut to form a beveled edge on the material at a right angle to its side edges.

2. Card cutting apparatus as set forth in claim 1, the said guide member being provided with a diagonal guide groove in its face, and the movable knife blade having a projection on its surface which is slidable in the said groove.

3. Card cutting apparatus as set forth in claim 1, the said guide member being hollow, a clamping block arranged inside the hollow guide member, and means for pressing the clamping block downwardly to clamp the card against the surface of the table.

4. Card cutting apparatus as set forth in claim 1, the said guide member being hollow, a spring supported clamping block arranged inside the hollow guide member, and a cam mounted on the said guide member and adapted to press the clamping block downwardly to clamp the card on the table.

5. Card cutting apparatus, comprising a table having a recess in its upper surface extending from its receiving edge towards its delivery edge and forming a pocket under the card to facilitate its removal, a guide member secured to the table and having a face arranged at an acute angle to its surface and provided with a diagonal guide, and a movable knife blade adapted to be slid along the said guide to cut the card at the delivery edge of the table.

6. Card cutting apparatus, comprising a table having parallel guide grooves in its surface, strips slidable in the said grooves and arranged flush with the surface of the table, a cross strip for engaging the card secured over the delivery end portions of the slidable strips, means for clamping the slidable strips to the table, a guide member secured to the table and extending above the said cross strip and having a face arranged at an acute angle to the surface of the table and provided with a diagonal guide, and a movable knife blade adapted to be slid along the said guide to cut the card at the delivery edge of the table.

7. Cutting apparatus of the character described comprising a table, a cutting blade fixed to the front edge of said table, a hollow bridge fixed to and extending over said table the said bridge having an inclined front face formed with a guide slot that extends diagonally along the length of said front face, a work clamping bar arranged within said hollow bridge, springs normally raising said clamping bar clear of said table, means for pressing said clamping bar downwardly towards said table against the action of said springs, a movable cutting knife, and a guide member fixed to said movable cutting knife adapted to engage the guide slot in the inclined front face of said hollow bridge.

8. Cutting apparatus of the character described comprising a work supporting table, a cutting blade fixed to the said table at an angle to the supporting surface thereof, a hollow bridge fixed to and extending over said table the said bridge having an inclined front face formed with a guide slot that extends diagonally along the length of said front face, a work clamping bar arranged within said hollow bridge, springs normally raising said clamping bar clear of said table, means for pressing said clamping bar downwardly towards said table against the action of said springs, a movable cutting knife, and a guide member fixed to said movable cutting knife adapted to engage the guide slot in the inclined front face of said hollow bridge.

In testimony whereof I affix my signature.

GEORGE STANLEY WALPOLE.